May 21, 1929. J. BOREL 1,713,737
SYSTEM OF STREET AND VEHICLE LIGHTING
Filed Feb. 9, 1927 2 Sheets-Sheet 1
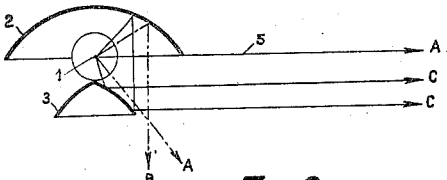
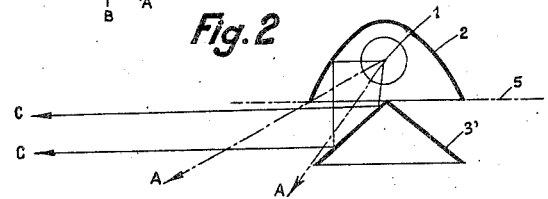
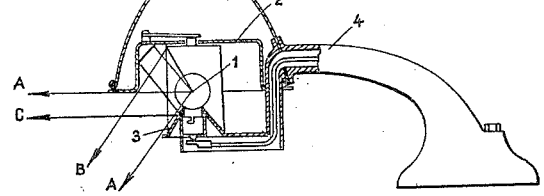
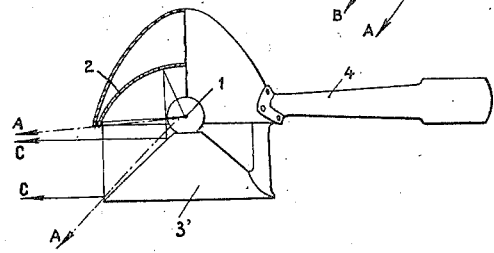
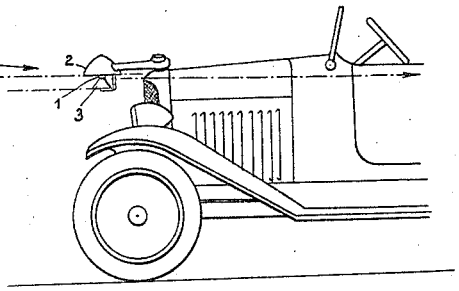
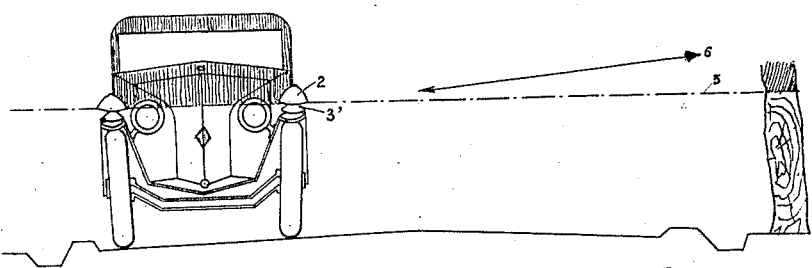
INVENTOR:
JOSEPH BOREL,
per Chatwin &Co
ATTORNEYS.

May 21, 1929.  J. BOREL  1,713,737

SYSTEM OF STREET AND VEHICLE LIGHTING

Filed Feb. 9, 1927  2 Sheets-Sheet 2

INVENTOR:
JOSEPH BOREL
per Chatwin & Co.
ATTORNEYS.

Patented May 21, 1929.

1,713,737

UNITED STATES PATENT OFFICE.

JOSEPH BOREL, OF ANNECY, FRANCE.

SYSTEM OF STREET AND VEHICLE LIGHTING.

Application filed February 9, 1927, Serial No. 167,026, and in France November 5, 1926.

This invention has for an object a new system of street and vehicle lighting adapted to light the roadway over a wide circular zone during traffic agglomeration or the passing by of other vehicles both at the front as well as at the sides of the vehicle to position a vehicle provided with such an arrangement by illuminating its front, and to avoid all dazzling of road users, pedestrians and inhabitants of a district by the luminous focus.

To obtain this object the new apparatus has the following characteristics:

The new combination of two horizontal reflectors with the same vertical axis, arranged opposite each other.

(1) A converging reflector disposed above the lamp, hiding the luminous focus and intercepting all dazzle rays which it concentrates and projects in a vertical beam from top to bottom.

(2) A diverging reflector disposed below, receiving and projecting the rays reflected by the first reflector, horizontally and diffusing them over a wide area in all directions but below a predetermined horizontal plane.

The arrangement of this device on the wings or bonnet of a vehicle, that is at a height at which no rays can dazzle anyone, driver or pedestrian, and in a manner to illuminate the whole front of the vehicle carrying same.

This device can have various modifications in its constructional details.

The focus can preferably be disposed in the horizontal plane of the edges of the converging reflector but likewise within this reflector.

The diverging reflector can correct all or only part of the reflected rays from the converging reflector.

Both reflectors can be rigidly secured to their supports or can be adjustable so as to be inclined to suitably turn the beam of light by compensating for the angle or inclination of the supporting member such as the mud guard or bonnet on which the lamp is carried, the adjusting means thus rendering the headlamp serviceable on all kinds of vehicles.

The two reflectors can have various appropriate shapes and combined together in different manners.

The accompanying drawing given by way of example shows:

Fig. 1 is a longitudinal diagrammatic section representing, according to the present invention the disposition of an upper converging reflector of which the sides are placed in the horizontal plane the luminous focus and a lower reflector not placed horizontally to a part of the rays projected by the first reflector.

Fig. 2 is a longitudinal diagrammatic section representing the disposition of a lamp in the focal plane of the upper reflector and of a lower reflector placed horizontally to all the rays projected by the first reflector.

Fig. 3 is a plan in elevation longitudinal section of a head lamp constructed according to the invention shown at Fig. 1.

Fig. 4 is a plan half in longitudinal section and half in elevation of a head lamp constructed according to Fig. 2.

Fig. 5 is a plan of the side of an automobile provided with a head lamp constructed according to the invention and mounted on the base of the radiator cap; this one shows the projection of the luminous rays in all directions.

Fig. 6 is a plan of the face of an automobile provided with two head lamps constructed according to the invention and mounted on the mud guard, this one shows the projection of the luminous rays laterally.

Figure 7:
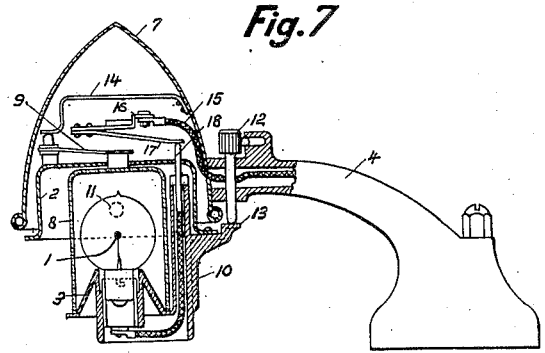
Fig. 7 is an elevated plan in longitudinal section of a practical form of using the new head lamp provided with a special device to regulate the inclination of the reflectors and the lamp.

In Fig. 1, the arrangement of the two converging and diverging reflectors, the latter correcting only part of the rays reflected by the first and by the lamp whose focus is disposed in the horizontal plane of the edges of the converging reflector; Fig. 2 a modification in which the diverging reflector corrects all the rays reflected by the converging reflector and the lamp is disposed in the focal axis of the converging reflector; Figs. 3 and 4, two forms of construction of the new headlamp with partial or total diffusion and supports which permit or fitting same on the mudguards or on the radiator cap; Figs. 5 and 6, two supports for this kind of headlamp to a radiator cap or the mudguards of a motor vehicle and the zone of illumination of said lamp; Fig. 7, a form of lamp in which the lower diverging reflector is adjustable; Figs. 8 to 11, four ways of adjusting the turning and setting of the reflectors. Further Figs. 8 to 13 show several forms, not intended to limit the invention, of upper and lower reflectors and various combinations of these forms.

In Figs. 1 to 6 of this drawing, 1 is the luminous centre or focus of the lamp which can, according to the nature and shape of the reflectors occupy a vertical position with the socket at the top, or at the bottom, a horizontal or any other position. 2 is the converging reflector which intercepts all rays likely to cause dazzle and projects them in a vertical beam from top to bottom. 3 (Figs. 1, 3 and 5) is a diverging reflector placed beneath the former, receiving and correcting part of the rays reflected by the reflector 2 in order to project them horizontally to a long distance. 3' (Figs. 2, 4 and 6) is a diverging reflector totally correcting the rays reflected from a reflector 2.

The reflectors 2, 3 and 3' may have any appropriate shape for their purpose and combined to give the maximum return, and a uniformly distributed illumination with the greatest possible range. 4 is the lamp support which may have any appropriate shape to suit the place where the lamp is to be carried and the characteristics of each type of vehicle or shape of mudguard. 5 is the horizontal axis above which no direct or reflected rays are projected. 6 represents the eye of a pedestrian or driver at normal height and to whom the focus of light is always hidden.

In the arrangement shown at Fig. 1 there can be distinguished three series of projected rays, the direct rays A from the focus 1 which illuminate in all directions and at all points below the horizontal axis 5 determined by the edges of reflector 2. The rays B reflected by the reflector 2 projected at a slight distance onto the ground around the headlamp. The rays C reflected by the reflector 2 but intercepted by the reflector 3 which spreads them horizontally in all directions over a wide area thus increasing the luminous intensity of the direct rays A.

In the arrangement of Fig. 2 all the rays intercepted by the reflector 2 and reflected again are corrected and projected to a distance by the reflector 3'.

A very large circular zone around the vehicle carrying the device is thus illuminated at all points; at the front and at the sides, zones in which the luminous intensity is practically constant, instead of decreasing rapidly with the distance, by reason of the diverging reflector projecting the reflected rays far away.

By the combination of the two reflectors, all the rays emitted are utilized and equally spread in all directions.

By the disposition of the lamp and the height at which the converging reflector is placed the eye of a pedestrian or driver who is met on the road or that of an inhabitant of a locality passed through, is not dazed or blinded by the luminous focus which is always hidden from him.

The front of the vehicle carrying the device is illuminated by this lamp which determines exactly its position.

The whole width of the road and its lower sides are lit up so that the passing by of vehicles can take place under the best conditions without any danger.

This lighting system is combined, from the supply point of view, with the long distant road head lamps and used either alternately with these for passing through localities and passing other vehicles or simultaneously with them when taking corners so as to distinguish all the details of the low part of the road past the corner.

In Fig. 7 is shown a complete constructional arrangement of the new lamp provided with compensating regulating means for the lower reflector; in this figure: 1 is the luminous focus, 2 the upper reflector, 3 the lower reflector and 4 the supporting arm. 7 is a hood carried at the end of the supporting arm 4 and surmounting the lamp and its reflectors. 8 is a glass protecting chimney for the lamp, held in place in spite of vibration by a blade spring 9.

The two reflectors 2 and 3 and the lamp 1 are carried by a member 10 and oscillate in the hood 7 around two pivots 11 under the action of an adjusting screw 12 acting by pressure on an abutment 13 while a spring 14 arranged in the hood 7 tends to act in the inverse direction.

The electrical connections are arranged so as not to be affected by the inclination of the reflectors during adjustment. The leading-in wire 15 is connected to a terminal 16 and a blade spring 17 ensures constant contact with a contact piece 18 connected with the lamp holder.

The arrangement for turning the reflectors relative to their fixed point (mudguard or front of the bonnet) on which the lamp is placed can likewise be obtained by means of a regulating screw and counteracting spring in slightly different ways.

Figure 8:
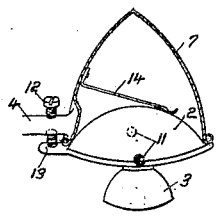
Figs. 8 to 13 are all elevated plans in longitudinal section showing different forms of combined reflectors and different systems of regulating the inclination of these reflectors.

In Fig. 8 the hood 7 is fixed, the reflectors 2, 3, alone are turnable around pivots 11 by the action of the screw 12 while the spring 14 keeps the reflectors in position after adjustment no matter what their inclination may be.

Figure 9:
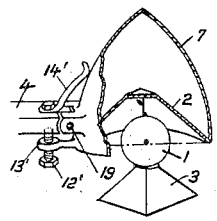

In Fig. 9 the hood 7 and the reflector 2 are turnable about the axis 19 under the action of a screw 12' butting against a supporting arm 4 and screwing into the part 13'. The spring 14' re-acts against the hood 7 and is secured to the support 4.

Figure 10:
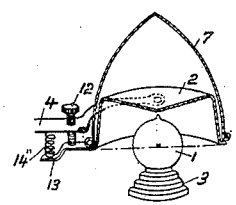

In Fig. 10 the hood and the reflector are turnable on the supporting fork bracket 4 and oscillate by the action of the screw 12. The spring 14″ is a coiled spring working under tension between the fork 4 and the part 13.

Figure 11:
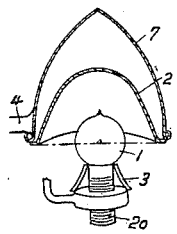
Figure 12:
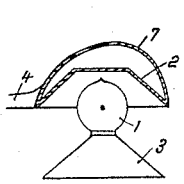
Figure 13:
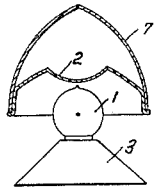

In Fig. 11 the hood and the upper reflector are fixed, adjustment being effected by raising or lowering the luminous point by means of a screw socket 20.

As regards the reflectors, they may have any shape whether symmetrical or not, convex or concave, circular, oblong or polygonal.

The reflectors 2 can be cylindrical with a flat bottom as in Fig. 7, elliptical or hemispherical as in Fig. 8, conical, trunconic or prismatic as in Fig. 9, ovoidal as in Fig. 11, concave as in the previous figures or with convex bottom as in Fig. 10 whether this bottom be conical, trunconic, incurved or otherwise.

The reflectors 3 can be shaped as at Fig. 8, incurved as at Fig. 11, trunconic or prismatic as at Fig. 9, with horizontal graduations as in Fig. 10 or with vertical sides.

The shape of the reflectors 2 and 3 are so combined together to give the best return and a distribution as uniform as possible of the luminous intensity.

I claim:

1. In a non-dazzle headlight, in combination, a circular converging upper reflector, means for supporting the same with its axis vertical, a horizontally disposed reflector located beneath said upper reflector and upon the same vertical axis, a lamp arranged within said upper reflector at such height as to render the focal point thereof invisible to drivers and pedestrians, a common pivotal mounting for said reflectors, a fixed carrier for the lamp, a pressure screw between said fixed carrier and said reflectors and a steadying spring for holding said reflectors in their adjusted position.

2. A non-glare vehicle headlight structure of the character described, comprising an upper concave reflector disposed upon substantially a vertical axis with its open side at the bottom, a lamp bulb substantially centrally arranged within the open lower side of said reflector and at such height with respect to said reflector that the lower horizontal edges of the latter intercept all rays above the horizontal, a second reflector disposed below the lamp bulb, said second reflector being downwardly divergent and of such size that its lower edge extends materially beyond the vertical plane of the lamp bulb, so that it will intercept and deflect outwardly in all directions, rays reflected downwardly by the upper reflector, the shape of the second reflector being such that it reflects no rays above the horizontal, and means for bodily tipping the uppermost of said reflectors about a transverse horizontal pivotal point to thereby vary the inclination of the axis of said reflector.

3. In a non-glare vehicle headlight, the combination with an upper reflector having its axis disposed substantially vertical, of a source of light therein, disposed at such height with respect to the lower edge of the reflector that the reflector intercepts all rays above the horizontal, a second reflector disposed below and facing the first named reflector, adapted to receive the rays reflected therefrom, and to direct them outwardly, said lower reflector having its axis coincident with the axis of the upper reflector, and being so shaped as to reflect no rays above the horizontal, a support by means of which the whole unit may be mounted upon a vehicle, and means for bodily tipping said reflectors with respect to said support while maintaining the axes of the two reflectors coincident.

JOSEPH BOREL.